(12) United States Patent
Wehner

(10) Patent No.: US 7,665,478 B2
(45) Date of Patent: Feb. 23, 2010

(54) COLLAPSIBLE GREENHOUSE

(76) Inventor: Scott D. Wehner, 4407 W. Stanley Rd., Mt. Morris, MI (US) 48458

(*) Notice: Subject to any disclaimer, the term of this patent is extended or adjusted under 35 U.S.C. 154(b) by 724 days.

(21) Appl. No.: 10/889,675

(22) Filed: Jul. 13, 2004

(65) Prior Publication Data

US 2005/0039388 A1 Feb. 24, 2005

Related U.S. Application Data

(60) Provisional application No. 60/496,108, filed on Aug. 19, 2003, provisional application No. 60/549,021, filed on Mar. 1, 2004.

(51) Int. Cl.
*E04H 15/40* (2006.01)
*A01G 9/00* (2006.01)

(52) U.S. Cl. .................. 135/126; 135/117; 135/115; 135/135; 47/17

(58) Field of Classification Search .......... 135/124–126, 135/128, 136–137, 160, 115, 901, 907, 117; 47/17, 30
See application file for complete search history.

(56) References Cited

U.S. PATENT DOCUMENTS

| | | | |
|---|---|---|---|
| 1,669,484 A * | 5/1928 | Mowry | ............ 135/87 |
| 1,803,626 A * | 5/1931 | Lasley | ............ 135/128 |
| 3,502,091 A | 3/1970 | Corbin | |
| 3,675,667 A | 7/1972 | Miller | |
| 3,766,932 A | 10/1973 | Sidis et al. | |
| 3,810,482 A | 5/1974 | Beavers | |
| 3,941,140 A | 3/1976 | Beavers | |
| 3,960,161 A | 6/1976 | Norman | |
| 3,990,463 A | 11/1976 | Norman | |
| 4,023,306 A | 5/1977 | Ruggieri, Jr. | |
| 4,026,312 A | 5/1977 | Beavers | |
| 4,067,346 A | 1/1978 | Husted | |
| 4,077,417 A | 3/1978 | Beavers | |
| 4,154,253 A * | 5/1979 | McCullough | ............ 135/124 |
| 4,285,354 A | 8/1981 | Beavers | |
| 4,425,929 A | 1/1984 | Von Mosshaim | |
| 4,637,748 A | 1/1987 | Beavers | |
| 4,724,181 A | 2/1988 | Mingenbach | |
| 4,815,784 A | 3/1989 | Zheng | |
| 4,819,680 A * | 4/1989 | Beavers | ............ 135/125 |
| 4,941,499 A | 7/1990 | Pelsue et al. | |
| 4,950,511 A | 8/1990 | Francis | |
| 4,951,333 A | 8/1990 | Kaiser et al. | |
| 4,998,552 A | 3/1991 | Niksic et al. | |
| 5,010,909 A | 4/1991 | Cleveland | |
| 5,024,262 A | 6/1991 | Huang | |
| 5,038,812 A | 8/1991 | Norman | |
| 5,069,572 A | 12/1991 | Niksic | |

(Continued)

OTHER PUBLICATIONS

Ameristep Quality Hunting Catalog 2002, pp. 4-11.

*Primary Examiner*—Winnie Yip
(74) *Attorney, Agent, or Firm*—Young Basile

(57) ABSTRACT

The specification discloses a collapsible structure comprising at least one foldable frame element defining at least three corners of at least one wall element. A flexible material is connected to and extends about the at least one foldable frame element to define an interior space. The flexible material has integral fibers and at least a portion of the material allows the transmission of at least infrared and visible wavelengths of electromagnetic radiation.

22 Claims, 7 Drawing Sheets

U.S. PATENT DOCUMENTS

| | | | |
|---|---|---|---|
| 5,137,044 A | 8/1992 | Brady | |
| 5,140,768 A * | 8/1992 | Forbes | 47/17 |
| 5,179,798 A | 1/1993 | Sonagere | |
| 5,222,513 A | 6/1993 | Hilliard | |
| 5,301,705 A | 4/1994 | Zheng | |
| 5,375,368 A * | 12/1994 | Motz, Jr. | 47/30 |
| 5,394,897 A | 3/1995 | Ritchey et al. | |
| 5,411,046 A | 5/1995 | Wan | |
| 5,467,794 A | 11/1995 | Zheng | |
| 5,519,964 A * | 5/1996 | Kujirai et al. | 47/17 |
| 5,560,385 A | 10/1996 | Zheng | |
| 5,579,799 A * | 12/1996 | Zheng | 135/126 |
| 5,605,007 A * | 2/1997 | Hinsperger | 47/17 |
| 5,660,002 A * | 8/1997 | Lashinger | 52/63 |
| 5,664,596 A | 9/1997 | Zheng | |
| 5,692,337 A * | 12/1997 | Motz, Jr. | 47/30 |
| 5,778,915 A | 7/1998 | Zheng | |
| 5,816,279 A | 10/1998 | Zheng | |
| 5,975,101 A * | 11/1999 | Zheng | 135/125 |
| 6,014,837 A * | 1/2000 | Morgan | 47/31 |
| 6,019,112 A * | 2/2000 | Matlock | 135/124 |
| 6,021,794 A | 2/2000 | Guerra | |
| 6,088,953 A * | 7/2000 | Morgan | 47/31 |
| D429,307 S * | 8/2000 | Wu et al. | D21/834 |
| 6,098,335 A | 8/2000 | Brown, Jr. | |
| 6,155,281 A | 12/2000 | Zheng | |
| 6,209,557 B1 | 4/2001 | Zheng | |
| 6,257,263 B1 * | 7/2001 | Brereton | 135/126 |
| 6,269,826 B1 | 8/2001 | Zheng | |
| 6,296,415 B1 | 10/2001 | Johnson et al. | |
| 6,325,086 B1 * | 12/2001 | Shinner et al. | 135/126 |
| 6,390,111 B2 | 5/2002 | Zheng | |
| 6,499,260 B2 | 12/2002 | Kasinger et al. | |
| 6,575,185 B2 | 6/2003 | Zheng | |
| 6,701,948 B2 * | 3/2004 | Jopp et al. | 135/97 |
| 6,892,743 B2 * | 5/2005 | Armstrong et al. | 135/143 |
| 7,121,290 B2 * | 10/2006 | Eastman, II | 135/121 |

\* cited by examiner

COLLAPSIBLE GREENHOUSE

This application claims the benefit of U.S. Provisional Application No. 60/496,108, filed Aug. 19, 2003, and U.S. Provisional Application No. 60/549,021, filed Mar. 1, 2004.

FIELD OF THE INVENTION

The present invention relates to a collapsible, portable structure, and more particularly, a collapsible, portable structure that can be utilized as a greenhouse wherein the structure is easily folded into a compact package for ease of transportation and storage.

BACKGROUND OF THE INVENTION

Gardening, both for food production and recreation, is becoming increasingly popular. Greater numbers of gardeners are utilizing small greenhouses to protect plants from inclement weather while still ensuring continued exposure of the growing plants to sunlight. The use of greenhouses for home gardening is well known. Such greenhouses come in a variety of shapes and sizes. Greenhouse window boxes are one popular version of a home greenhouse. These are particularly well-adapted for installation in a double-hung window frame. Unfortunately, these sorts of greenhouses are small and often unsightly in home use applications.

More predominant are elaborate rigid-frame structures that sit on the ground and over which clear membranes are stretched to obtain greenhouse effects. Such devices, even when claiming to be portable, are generally bulky, labor-intensive, and difficult to move. Such devices usually rely upon rigid, as opposed to flexible, frame elements and generally require the use of tools for assembly and disassembly.

At the other end of the spectrum are greenhouse devices that, while portable, are so flimsy as to require frequent repair and replacement. A common instance of this type of device uses U-shaped wire frame elements to straddle one or more plants. A transparent, plastic film is then attached to the wire frame elements. Such structures have difficulty surviving even moderate weather conditions and are easily damaged in one or more of the set-up, take-down, or storage processes.

It would therefore be desirable to have a greenhouse device that is lightweight and portable, yet strong enough to endure the rigors of severe weather and repeated set-up, take-down, and storage cycles.

SUMMARY OF THE INVENTION

The present invention is a collapsible structure having at least one foldable frame element that defines at least three corners of at least one wall element. A flexible material is connected to and extends about the at least one foldable frame element in order to define an interior space. The material has integral fibers to enhance its tensile performance, and the material allows for the transmission of at least infrared and visible wavelengths of electromagnetic radiation.

The flexible covering material may incorporate a variety of features in various embodiments. Specifically, in one embodiment, the material may be waterproof. In another embodiment, the covering material is resistant to decay from ultraviolet electromagnetic radiation, and that resistance may be provided by a coating applied to the material. In at least one embodiment, polyethylene is the flexible covering material.

In a further embodiment of the present invention, the covering material is provided in excess around the base of the structure to form a skirt. The skirt may extend externally from the structure and also may extend into the interior of the structure. The skirt is useful in providing appropriate means by which the structure may be secured to the ground. The skirt may also aid in providing resistance to penetration by wind or moisture within the structure.

The structure may also be described as having a plurality of wall elements with each of said wall elements having a foldable frame element, with each frame element further defining at least three corners of its corresponding wall element. The flexible material is then connected to and extends about the frame elements to define an interior space, and that material allows for the transmission of at least infrared and visible wavelengths of electromagnetic radiation.

In one embodiment of the present invention, the frame elements consist of a central hub, at least three stringers each having a hub end and a terminal end, the hub ends of the at least three stringers connected to the hub, and the stringers extending radially outward from the hub. In this embodiment, each stringer may be pivotally joined to its respective hub. Further, the terminal ends of the stringers provided on adjacent wall elements may substantially meet at corresponding corners of the adjacent wall elements. In a further embodiment, pockets are provided on a material at the corners to receive the terminal ends of the stringers. In these embodiments, the structure collapses in a folded configuration which is elongate but relatively small in diameter, facilitating the storage of the folded structure.

In yet another embodiment of the present invention, each of the frame elements is a continuous band of resilient material that substantially defines the perimeter of each of the aforesaid wall elements. Each of these frame elements has sufficient flexibility to be coiled without breaking and sufficient resiliency to substantially return to and maintain its original shape. In this embodiment, the resilient frame member is generally confined to the perimeter of a wall element and urges the perimeter of the wall into a predetermined shape by virtue of the spring-like resiliency of the frame member. Since the frame member conforms to the shape of the perimeter wall in which it is confined, it is possible to create a variety of structures having various cross-sections simply by modifying the shape of the perimeter in which the resilient member is confined. Further, because the resilient member or members forming the frame are coilable, it is possible to collapse the frame, perimeter, and associated wall elements simply by folding the wall elements into a coplanar relationship and rolling the frame elements, which urges them into overlapping coils having a diameter substantially smaller than the largest diameter of the erected structure.

Several embodiments of the present invention further include one or more access ports or closable vents to permit access to the interior space of the structure. Further apertures may be provided to regulate the temperature and humidity of the air within the structure.

DESCRIPTION OF THE ILLUSTRATED EMBODIMENTS

Figure 1:
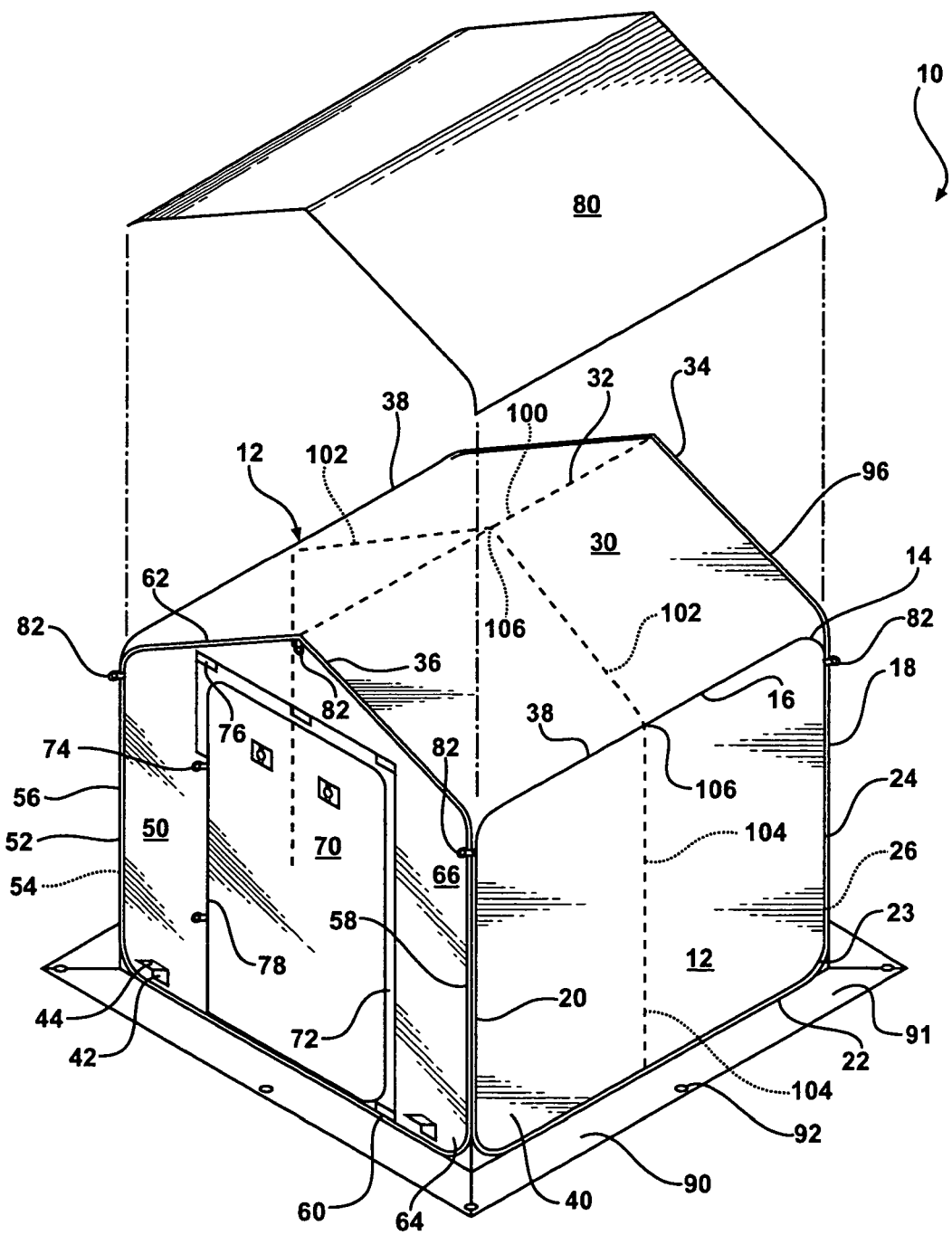
FIG. 1 is a perspective view of a first embodiment of the collapsible structure showing the removability of the roof cover of that embodiment.

FIG. 1 illustrates a collapsible structure or greenhouse 10. The greenhouse 10 is formed from sidewalls 12, end walls 50, and roof 30. Each of the walls 12, 50, and roof 30 consist of a covering material 40 connected to and extending about rigid or semi-rigid frame members 26.

The side walls 12 of the greenhouse 10 are substantially rectangular in shape, although the present invention anticipates that various geometries may be utilized. The side walls 12 each have a top edge 16, back edge 18, front edge 20, and bottom edge 22. These edges, 16, 18, 20, 22, meet at radiused corners 23. The edges 16, 18, 20, 22 and corners 23 constitute a perimeter 14 of each side wall 12. Coincident with the perimeter 14 of side walls 12 is a sleeve 24 containing a resilient frame member 26. The sleeve 24 may be formed as a hem in covering material 40 of the side walls 12 or may be made of other suitable material and attached to the perimeter 14 of the covering material 40 of the side walls 12 by stitching, adhesives, ultrasonic welds, or any other known method of connecting the hem to the covering material 40. The resilient frame members 26 have sufficient flexibility such that a user may coil the frame members 26 over upon themselves. The resilient frame members 26 also have sufficient resiliency and strength to substantially maintain a fully extended shape of perimeter 14 of side panel 12 by tensile forces communicated through sleeve 24 to the covering material 40. The frame members 26 may be fabricated from known materials such as spring steel or fiberglass.

Each end wall 50 of the greenhouse 10 is constructed in similar fashion to the side walls 12. A perimeter sleeve 52 captures a resilient frame member 54 to define a first edge 56, second edge 58, bottom edge 60, top edge 62, and radiused corners 64 of each of the end walls 50. Each perimeter sleeve 52 of each end wall 50 further defines a platform 66 of each end wall 50. These platforms 66 may be angled upward along top edges 62 to create the overall shape of a roof gable. End walls 50 may also be formed in different geometric platforms as may be suitable for particular applications. First and second edges 56, 58 of end walls 50 are attached to the respective back and front edges 18, 20 of side walls 12 by stitching, adhesives, ultrasonic welds, or other known attachments.

The roof 30 of the greenhouse 10 has an apex 32, a roof back edge 34, a roof front edge 36, and roof side edges 38. Covering material 40 or other suitable material meets at top edges 16 of side walls 12 and top edges 62 of end walls 50 to form the roof 30. The covering material is supported by top edges 16 of the side walls 12, top edges 62 of end walls 50, as well as an apex support stringer 100 and roof support stringers 102. Wall support stringers 104 and frame members 26 of side walls 12 support roof support stringers 102. A union 106 is provided at every location where any of stringers 100, 102, or 104 intersect. Unions 106 are generally tubular in cross-section and are made from metal or other rigid material. The tubular cross-section of unions 106 forms sockets to receive ends or portions of intersecting stringers 100, 102, or 104. The ends or other portions of stringers 100, 102, or 104 that do not intersect or join with other stringers may be attached at suitable intervals to interior portions of covering material 40 of the greenhouse 10. Pockets (not shown) formed or sewn in the interior of covering material 40 may be used to slidably receive the ends of stringers 100, 102, and 104 where they are not connected to unions 106. Alternatively, any portion of stringers 100, 102, and 104 or unions 106 may be secured to the interior of the greenhouse 10 with ties (not shown) or the like. The stringers 100, 102, and 104 enhance the overall stability of the greenhouse 10, providing particular support to side walls 12 and roof 30 of the structure. The stringers 100, 102, and 104 may be constructed of any substantially rigid material such as any of various plastics, carbon or fiber composites, metals, or the like. Such materials are sufficiently rigid to provide the requisite support, however, the materials are sufficiently flexible to allow stringers 100, 102, and 104 to withstand the rigors of assembly and disassembly. Stringers 100, 102, and 104 may be of unitary construction or may be made in sections capable of being disassembled.

The edges 34, 36, and 38 of roof 30 are attached to the top edges 16, 62 of the side walls 12 and end walls 50 of the greenhouse 10. These seams may be made by stitching, adhesives, ultrasonic welds, or other means for attaching adjacent pieces of covering material 40. A roof cover 80 may also be employed to cover roof 30 by attaching to greenhouse 10 at ties 82. The roof cover 80 may be an opaque or semi-opaque sheet used to regulate the amount of light passing through the roof 30.

One or more doors 70 may be provided on one or more of the side walls 12 or end walls 50. A closure 72, such as a zipper, hook-and-loop fasteners, or the like, is provided on at least three edges of door 70 to facilitate a secure seal of the door 70 with covering material 40. The fourth edge of the door 70 defines a door hinge edge 78. A plurality of ties 74 may be located adjacent to the door 70 and used to secure the door in a rolled-up condition. The door 70 is constructed of the same covering material 40 as used elsewhere on the greenhouse. Alternatively, the door 70 may be constructed of a different material as needed for a particular application. Temporary fasteners 76, such as small strips of hook-and-loop fasteners, are provided at points along the margin of the covering material 40 surrounding door 70 to facilitate repeated openings and closings of door 70 when repeated use of the closure 72 is inconvenient. The closure 72 provides a more permanent and watertight seal than temporary fasteners 76. In addition, closure 72 may extend partially along a top portion of hinge edge 78 of door 70 in order to facilitate the opening of just the top portion of the door, thus providing optional venting of the greenhouse 10 for temperature or moisture control without fully opening door 70. A screen (not shown) may also be provided on the interior of door 70 to allow ventilation by means of the door 70 while providing protection against insects and vermin.

Watering ports 42 may be provided on one or more of the side walls 12 or end walls 50 of the greenhouse 10. The watering ports 42 are provided with port closures 44. The ports 42 with their associated closures 44 facilitate the introduction of water or electrical conduits, such as hoses and extension cords (not shown), for introducing water and electricity to the interior of the structure while maintaining the overall humidity and temperature integrity of the greenhouse 10.

Figure 8:
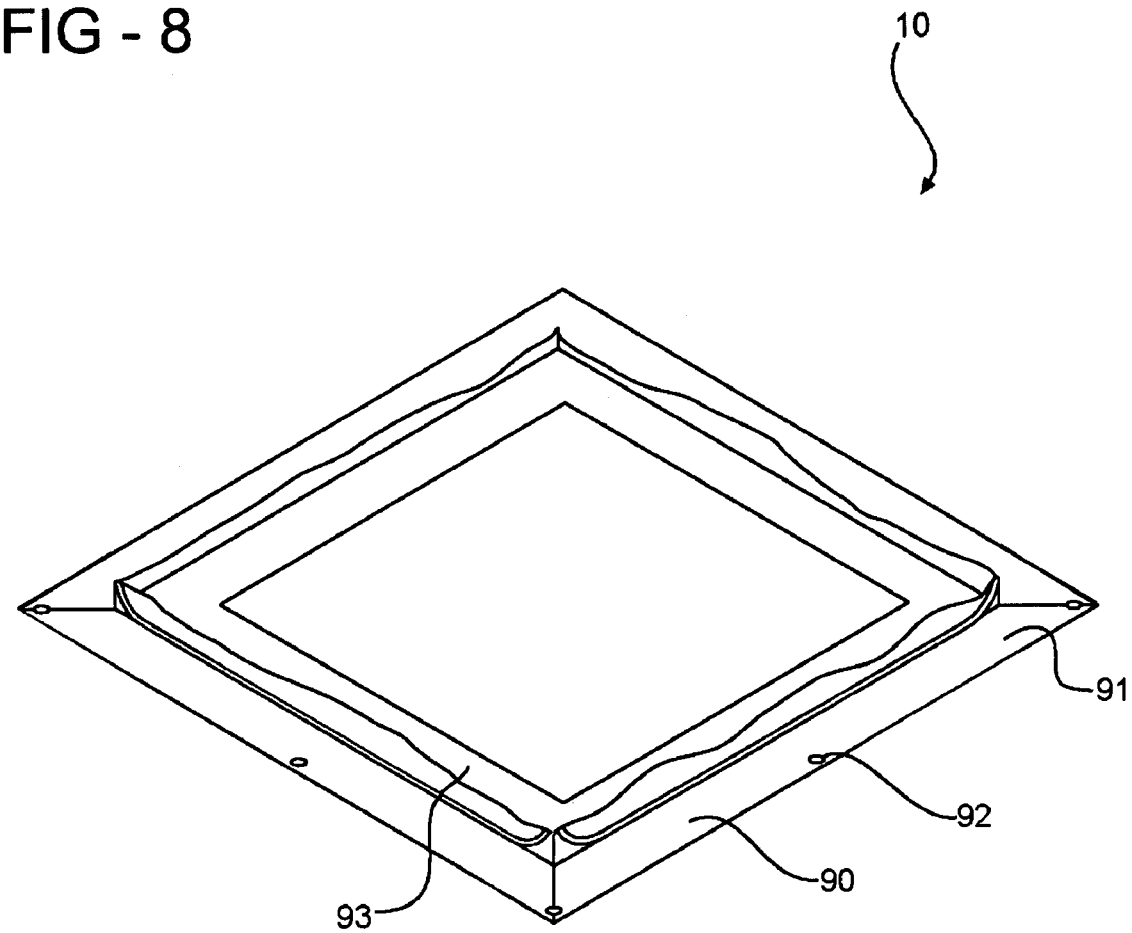
FIG. 8 is a partial cut-away view of the first embodiment of the collapsible structure showing the skirt extending into the interior of the collapsible structure.

A skirt 90 may be provided around the bottom edges 22 and 60 of the side walls 12 and end walls 50 of the greenhouse 10. The skirt 90 may include a portion 91 exterior to the side walls 12 and end walls 50 and a portion 93 interior to the side walls 12 and end walls 50, as best seen in FIG. 8. The skirt 90 provides both a wind and moisture barrier for preserving the appropriate temperature and humidity conditions within the greenhouse 10. The skirt 90 is attached to the bottom edges 22 and 60 by stitching, adhesives, ultrasonic welds, or other means for attaching the skirt 90 to bottom edges 22 and 60. Skirt openings 92 are provided on the exterior portion 91 of the skirt 90 and may be adapted to accept stakes, ropes, or other devices for securing the skirt 90 to the ground or other supporting surface. Heavy objects such as rocks, gravel, or stone may be applied on top of either the interior portion 93 or the exterior portion 91 of the skirt 90 in order to provide additional securement against breaches in the air or moisture integrity of the greenhouse 10. Alternatively, materials such as wood chips or straw may be used on skirt 90 for more decorative effects. In addition to securing the skirt 90 to a supporting surface, ropes or elastic bands (not shown) may be attached between ties 82 and the ground or other exterior support to provide additional stability to the greenhouse 10.

A zippered perimeter 96 may be provided at or near the perimeter sleeve 24 of one or more of side walls 12 or at or near the perimeter sleeve 52 of one or more of the end walls 50. The zippered perimeter 96 may be used to affix one greenhouse structure 10 to a second greenhouse structure (not shown) having a mating zippered perimeter. In such an arrangement, corresponding doors 70 on the two structures 10 may be aligned and opened to allow a user to travel between the two structures 10 or to provide ventilation between the two structures 10. In such an arrangement, one of the adjacent skirt exterior portions 91 is folded or rolled under its own greenhouse structure 10 in order to accomplish a close mating relationship of the adjacent greenhouse structures.

In order to provide greenhouse characteristics in the various embodiments, a flexible covering material 40 is provided throughout. The material 40 is substantially translucent or transparent, allowing for the transmission of infrared, visible, and ultraviolet wavelengths of electromagnetic radiation, thereby permitting necessary exterior light for the enhancement for the growth of vegetation to penetrate any of the various walls 12, 50, or roof 30 constructed of the flexible covering material 40. In addition, the material 40 may have integral fibers (not shown) to enhance its tensile performance. The flexible covering material 40 may also incorporate a variety of features in various embodiments. Specifically, in one embodiment, the material may be waterproof. In another embodiment, the covering material may be resistant to decay from ultraviolet electromagnetic radiation, and that resistance may be provided by a coating (not shown) applied to the material. Thermoplastic materials such as polyethylene may be used as the flexible covering material 40.

Figure 9:
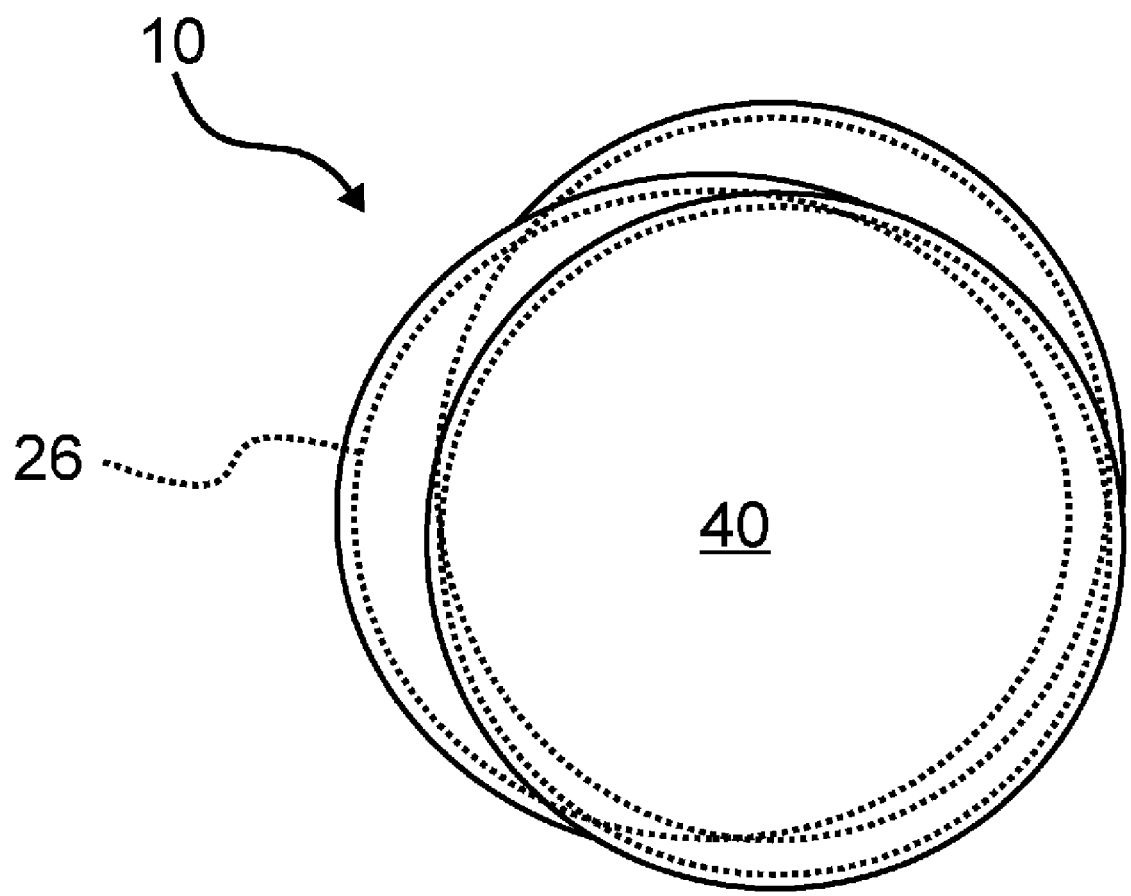
FIG. 9 is a top view of the first embodiment of the collapsible structure in a folded position.

The method of collapsing the greenhouse 10 will now be described. In order to collapse the greenhouse 10 of the present embodiment, the user first removes any plants or other vegetation (not shown) stored within the greenhouse 10. Next, the user removes any stakes, ropes, or other devices used to secure the greenhouse 10 to its location and removes stringers 100, 102, and 104. Next, the greenhouse 10 is made to lay substantially flat by bringing one set of opposing wall corners into contact with each other. In this configuration, one of side walls 12 will achieve a substantially coplanar relationship with one of the adjacent end walls 50, and the other side wall 12 will similarly achieve a substantially coplanar relationship with other end wall 50. In this condition, the greenhouse 10 will be substantially flat and appear to have two adjacent, flattened panels. Next, these two sets of panels are again folded such that side walls 12 and end walls 50 all lay in substantially the same plane. Throughout this folding process, covering material 40 forming roof 30 and skirt 90 is appropriately arranged to accommodate the panel folding process. Next, the user firmly grabs one corner of the collapsed panels 12 and 50 and begins to roll the collapsed panels. The resilient frame members 26 begin to collapse into an orientation of multiple overlapping coils. The covering material 40 forming the side walls 12, end walls 50, roof 30, and skirt 90 of the greenhouse 10 is again folded and smoothed in order to accommodate the coiled frame members 26 in a substantially compact fashion having an overall diameter approximately one-third of the diameter of the side walls 12 when in their fully opened configuration, as seen in FIG. 9. Once folded, the greenhouse 10 may be secured by straps (not shown) or placed inside of a container (not shown) for preventing the unwanted uncoiling of the greenhouse structure 10. When collapsed and not in use, greenhouse 10 is stored in a substantially dry location to prevent the formation of mold, mildew, or other contaminants.

Figure 2:
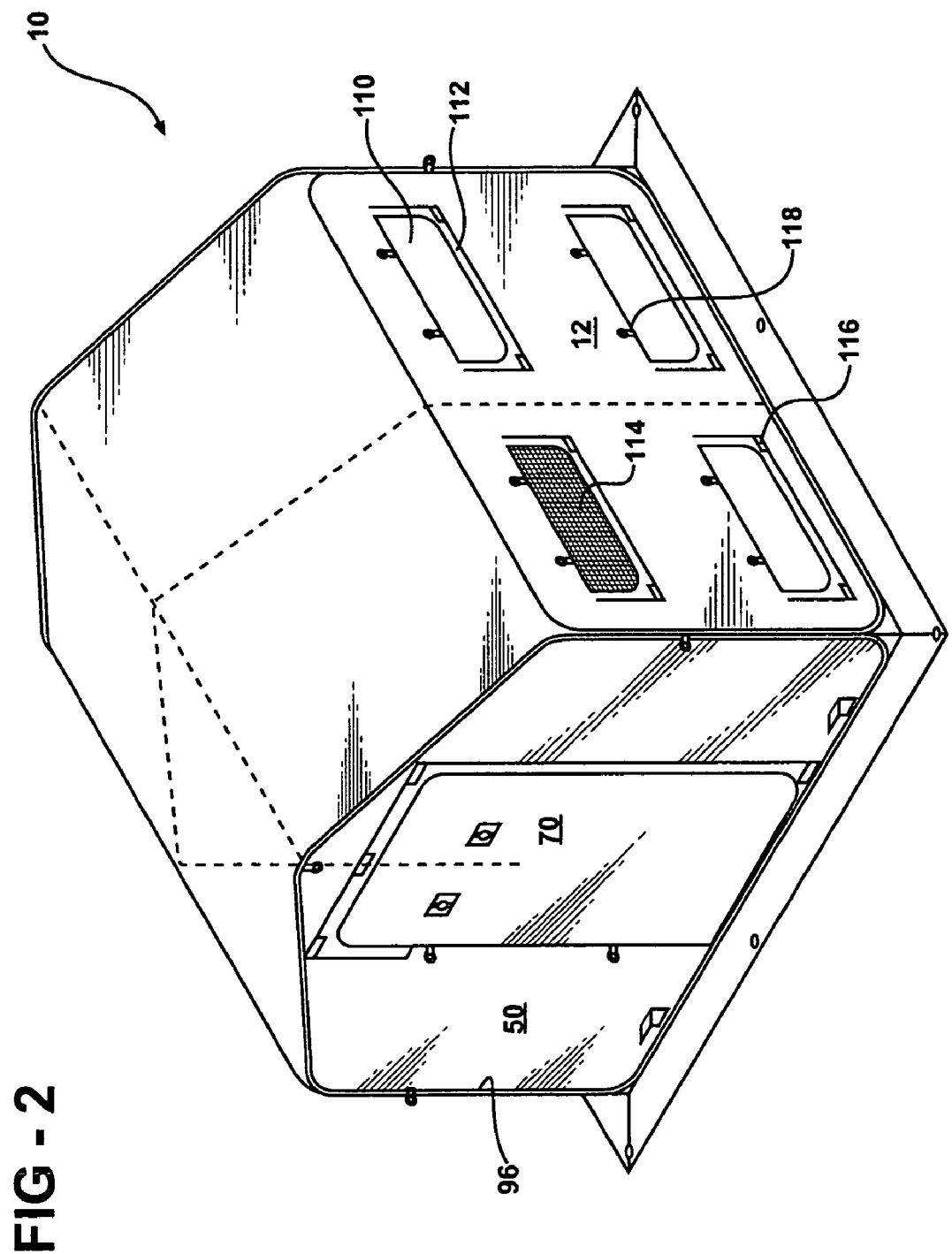
FIG. 2 is a perspective view of a second embodiment of the collapsible structure in which the structure has windows and window flaps.

FIG. 2 shows another embodiment of the greenhouse 10. In this embodiment, one or more windows 110 are provided on one or more of the side walls 12 or end walls 50. Window flaps 112 are used to cover windows 110. The flaps 112 are stitched to covering material 40 along an edge and are otherwise secured to windows 110 by zippers or other closures. As with the above-described door structure 70, small hook-and-loop closures 116 are used to provide temporary or less secure closure of window flaps 112. Additionally, hook-and-loop closures 116 aid in securing corners of window flaps 112 in the event of high winds or severe weather. Ties 118 are used to secure window flaps 112 in a rolled-up or folded-open position. Further, each window is provided with a mesh covering 114 to limit the ingress and egress of insects or vermin.

Figure 3:
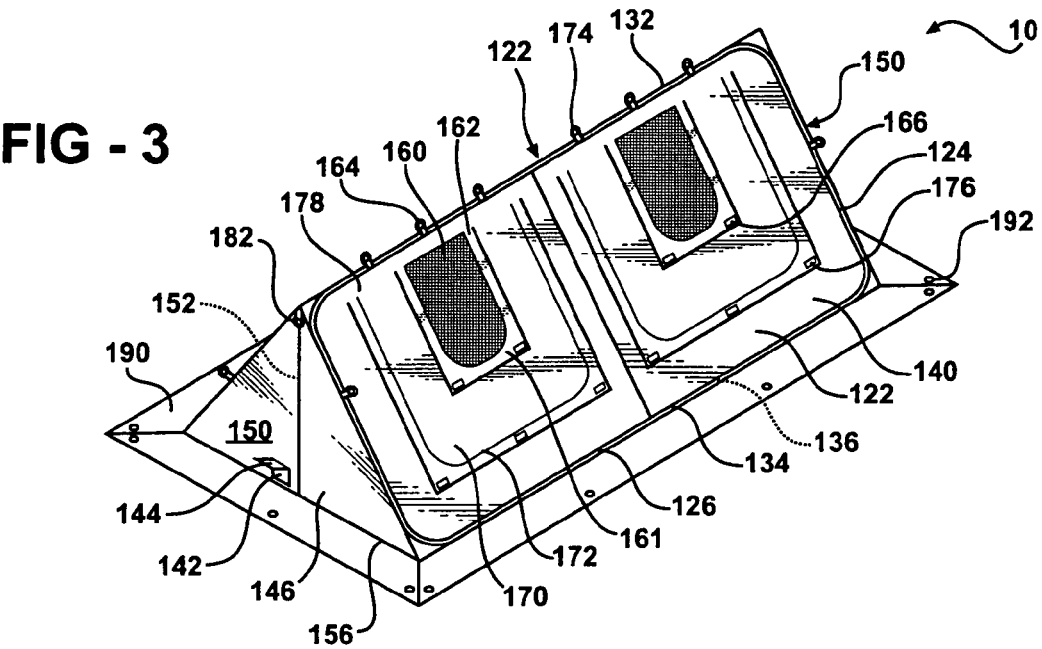
FIG. 3 is a perspective view of a third embodiment of the collapsible structure having a triangular cross-section.

Turning now to FIG. 3, another embodiment of greenhouse 10 is shown. In this embodiment, the greenhouse features side walls 122 and end walls 150. Side walls 122 are angled with respect to the ground such that they meet at an apex edge 132. Side walls further have bottom edges 126 which rest on the ground or other surface, and side walls 122 are generally circumscribed by side wall perimeters 124. Coincident with side wall perimeters 124 are sleeves 134 that are attached to a covering material 140 by way of stitching, adhesives, ultrasonic welds, or other fasteners. Inside of each sleeve 134 is a resilient frame member 136. The frame member 136 has sufficient flexibility such that it may be folded in a coiled fashion. The frame member 136 also has sufficient resiliency and rigidity to maintain the fully-opened perimeter shape of the wall 122. The resilient frame member 136 maintains this shape through tension exerted through sleeve 134 to urge the sleeve and attached covering material 140 to its most fully expanded position.

The end walls 150 of the greenhouse 10 are substantially triangular in shape and are composed of covering material 140. End walls 150 are attached to adjacent side walls 122 through stitching, adhesives, ultrasonic welds, or other fasteners. End walls 150 have bottom edges 156 that rest upon the ground or other surface. End walls 150 may be further supported by an optional end wall support stringer 152 to aid in maintaining the shape and appropriate rigidity of end walls 150.

Ties 182 are provided at appropriate intervals around the perimeter of end walls 150 and may be used for tying the structure to the ground or other support. Ties 182 may also be used for securing an opaque or partially opaque roof cover material (not shown).

Access ports 170 are provided on one or more of side walls 122 or end walls 150 of the greenhouse 10. Access ports 170 have a hinge margin 178 and are provided with a closure 172, such as a zipper or hook-and-loop fasteners or the like. When the closure 172 is in its open state, the covering material 140 covering the access port 170 may be rolled or folded and secured in a rolled or folded position by ties 174. Temporary closures 176, such as hook-and-loop type fasteners, are provided along the edges of access ports 170 to allow repeated access to the interior of the greenhouse 10 when it is undesirable to repeatedly operate closure means 172. In similar fashion, mesh windows 160 are nested within access ports 170 or may be provided elsewhere on side walls 122 or end walls 150 of the greenhouse 10. Windows 160 are provided with window flaps 161 and have window flap closures 162 to secure window flaps 161 over mesh windows 160 in a sealed state. Window flaps 161 may be made from covering material 140 or may be made from other suitable materials. Window flaps 161 may be rolled or folded and secured in an open position with ties 164. As with access ports 170, window flaps 161 are provided with temporary closures 166 for use when repeated or frequent opening and closing cycles are desired.

One or more watering ports 142 are provided on side walls 122 or end walls 150 of the greenhouse 10. Ports 142 have associated port closures 144 that may be secured in place by zippers, hook-and-loop fasteners, or other devices. Ports 142 are of sufficient size to provide access for water or electrical conduits such as hoses and extension cords (not shown) to introduce these items to the interior of the greenhouse 10.

The embodiment of the greenhouse 10 as shown in FIG. 3, may also be provided with a skirt 190 attached to bottom edges 126 and 156 of the side and end walls 122 and 150 of the greenhouse 10. The skirt 190 extends outward from the greenhouse 10 and may also extend into the interior of the greenhouse 10. In this embodiment, the skirt serves similar functions as in other embodiments. Specifically, the skirt 190 serves as a barrier to both moisture and wind and aiding in preserving the atmospheric integrity of greenhouse 10. Skirt openings 192 are provided for use in staking or tying down the greenhouse 10. Ties 182 may also be used for this purpose. In the event that the greenhouse 10 is not erected in a location suitable for driving stakes or otherwise tying down the greenhouse, weighted objects such as wood, rocks, gravel, cement blocks, or the like may be positioned on skirt 190 to secure the greenhouse 10 to a fixed location.

In order to collapse the greenhouse 10 of the present embodiment, the user first removes any plants or other vegetation stored within the greenhouse 10. Next, the user removes any stakes, ropes, or other devices used to secure the greenhouse 10 to its location. Next, side walls 122 are brought into contact with each other, and the covering material 140 forming end walls 150 and skirt 190 are appropriately folded to accommodate the substantially flat orientation of the greenhouse 10 when side walls 122 are substantially co-planar. Next, the user firmly grabs one corner of the collapsed side walls 122 and begins to roll or coil the collapsed side walls 122 upon themselves. The resilient frame members 136 begin to collapse into an orientation of multiple overlapping coils. The material 140 forming the side walls 122, end walls 150, and skirt 190 is appropriately folded and smoothed in order to accommodate the coiled frame members 136 in a substantially compact fashion having an overall diameter approximately one-third of the diameter of the side walls 122 when in their fully opened configuration. Once folded, the greenhouse 10 may be secured by straps (not shown) or placed inside of a container (not shown) for preventing the unwanted uncoiling of the greenhouse structure 10. When collapsed and not in use, greenhouse 10 is stored in a substantially dry location to prevent the formation of mold, mildew, or other contaminants.

Figure 4:
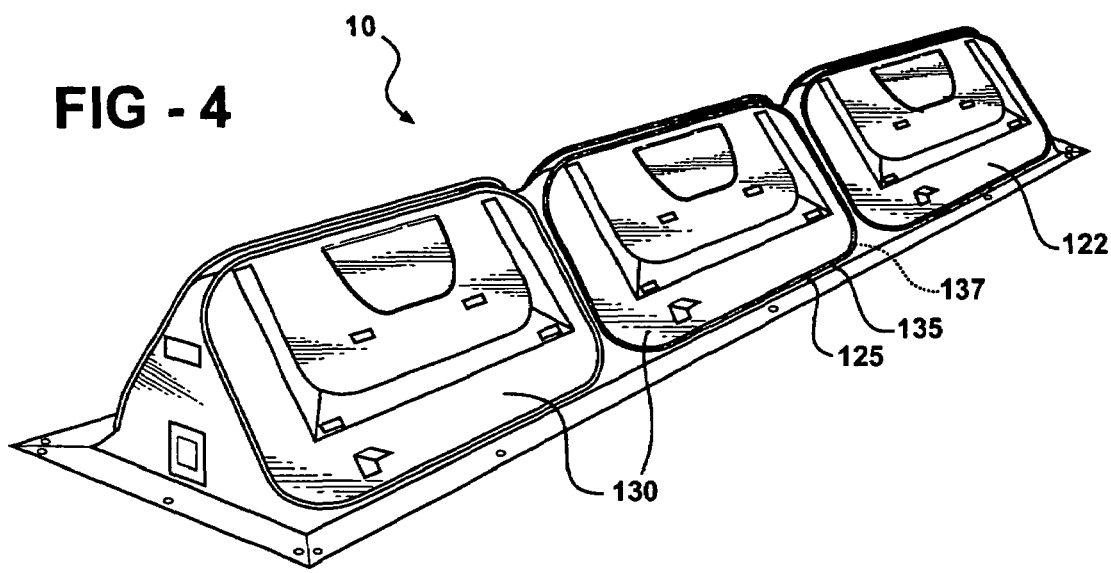
FIG. 4 is a perspective view of a fourth embodiment of the collapsible structure having a triangular cross-section and multiple panel elements.

FIG. 4 shows an alternative arrangement to this embodiment of greenhouse 10 wherein side walls 122 are composed of multiple panels 130. Each panel has a panel perimeter 125 with a coincident sleeve 135 housing a resilient frame member 137. A greenhouse 10 of this configuration is constructed and operates in similar fashion to the embodiment shown in FIG. 3. The use of panels 130 provides additional support to the side walls 122, allowing a greenhouse configuration to span a substantially greater length without sacrificing the substantial rigidity of the side walls 122. A greenhouse 10 of the configuration shown in FIG. 4 is collapsed by again bringing all side panels 130 and associated perimeters 125 into a substantially co-planar relationship and then folding or coiling the frame members 137 to collapse all overlapping panels in a coiled fashion.

Figure 5:
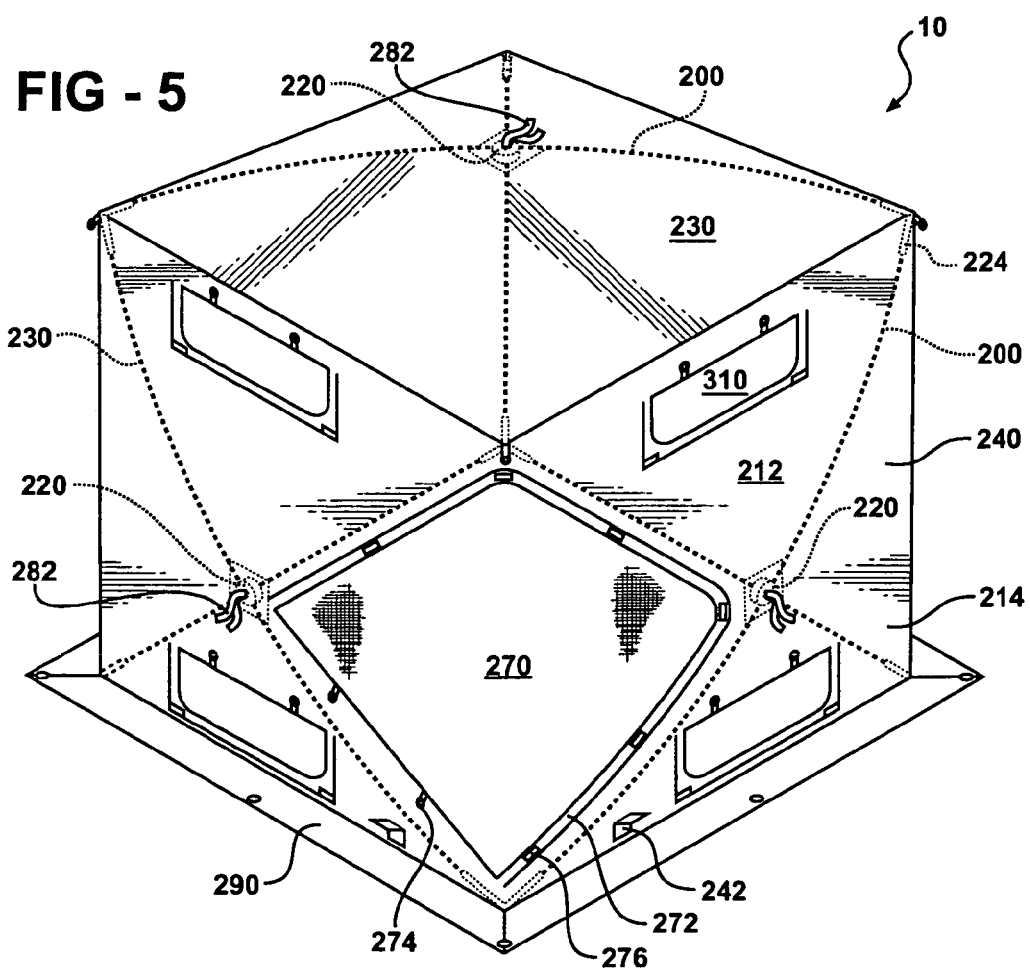
FIG. 5 is a perspective view of a fifth embodiment of the collapsible structure having a hub and stringer frame structure.

Yet another embodiment of the greenhouse 10 can be seen in FIG. 5. In this configuration, the greenhouse 10 has side walls 212 and a roof 230. The primary structural elements consist of hubs 220 and support stringers 200. The hubs 220 are provided in the center of each of side walls 212 and roof 230. Each support stringer 200 connects at one end to hub 220 and extends radially outward from hub 220 to a corner 214 of side wall 212 or roof 230. At the corner 214, each support stringer 200 is attached to covering material 240 by insertion into a corner sleeve 224 that is sewn or otherwise attached to covering material 240. Each support stringer 200 is pivotally affixed to its associated hub 220 by a pin (not shown) that allows the stringer to pivot with respect to the hub 220. Alternatively, each support stringer 200 may be affixed to its associated hub 220 by being inserted or screwed into a socket (not shown) provided in hub 220.

Each side wall 212 and the roof 230 of the greenhouse 10 is dimensioned in such a way that the diagonal length of the covering material 240 of each wall 212 and roof 230 is slightly shorter than the full length of corresponding diagonal support stringers 200 and their associated hub 220. Such dimensioning ensures that each support stringer 200 will maintain a slightly bowed configuration, providing appropriate tension on the covering material 240 on each wall 212 or roof 230 to assure the substantial rigidity of each of those elements when the greenhouse 10 is fully deployed.

As in other embodiments of greenhouse 10, the embodiment illustrated in FIG. 5 similarly includes one or more doors 270 with an appropriate closure device 272, ties 274, and temporary fasteners 276. In addition, one or more windows 310 may be provided with features similar to those disclosed in other embodiments. Additionally, the embodiment of the greenhouse 10 illustrated in FIG. 5 may be further provided with watering ports 242, a skirt 290, and ties 282 all for analogous uses as those described in the embodiments described above.

In the embodiment where support stringers 200 are not pivotally attached to their respective hubs 220, but rather screwed or inserted into sockets provided in hubs 220, assembly and disassembly of greenhouse 10 is achieved through piecemeal assembly of hubs 220, support stringers 200, and covering material 240. Where support stringers 200 are pivotally attached to hubs 220, a more rapid method of assembly and disassembly may be achieved. In this embodiment, in its disassembled state, hubs 220 of greenhouse 10 meet at substantially the same point. This point is placed on the ground or other surface on which the greenhouse 10 is to be erected. Support stringers 200, encapsulated within covering material 240, are spread apart, and the user locates the hub 220 associated with the roof 230. The user grabs the tie 282 located at hub 220 of roof 230 and draws the hub 220 and its associated pivotally-attached stringers 200 away from the ground or support surface until these elements achieve a bowed configuration with respect to the covering material 240 on roof 230. The user next locates hubs 220 associated with each of side walls 212 and similarly draws each hub 220 and support stringer assembly 200 in an outward fashion until each wall 212 achieves a substantially bowed configuration. The user may then appropriately tie down or otherwise secure greenhouse 10 to the surface on which it is erected. In collapsing the greenhouse 10, this process is reversed, where the user simply presses in at each side wall hub 220 and hub 220 of roof 230 until all hubs 220 meet at approximately the same location. The stringers 200, pivotally attached to the hubs, are then gathered into a substantially parallel orientation. The entire collapsed structure may then be stored in a somewhat elongate but relatively narrow diameter bundle. This bundle is then stored in an appropriate receptacle (not shown) or bound with straps (not shown).

Figure 6:
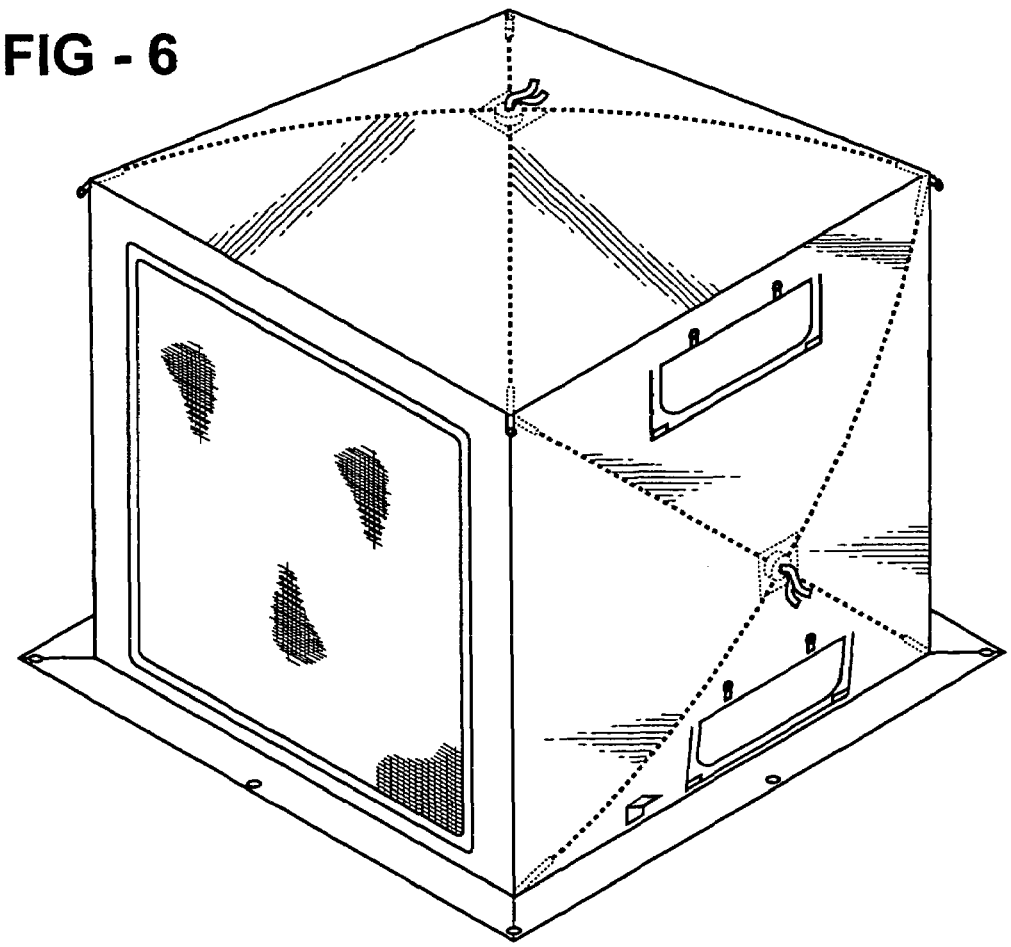
FIG. 6 is a perspective view of a sixth embodiment of the collapsible structure with a hub and stringer frame structure on only three walls and the roof
Figure 7:
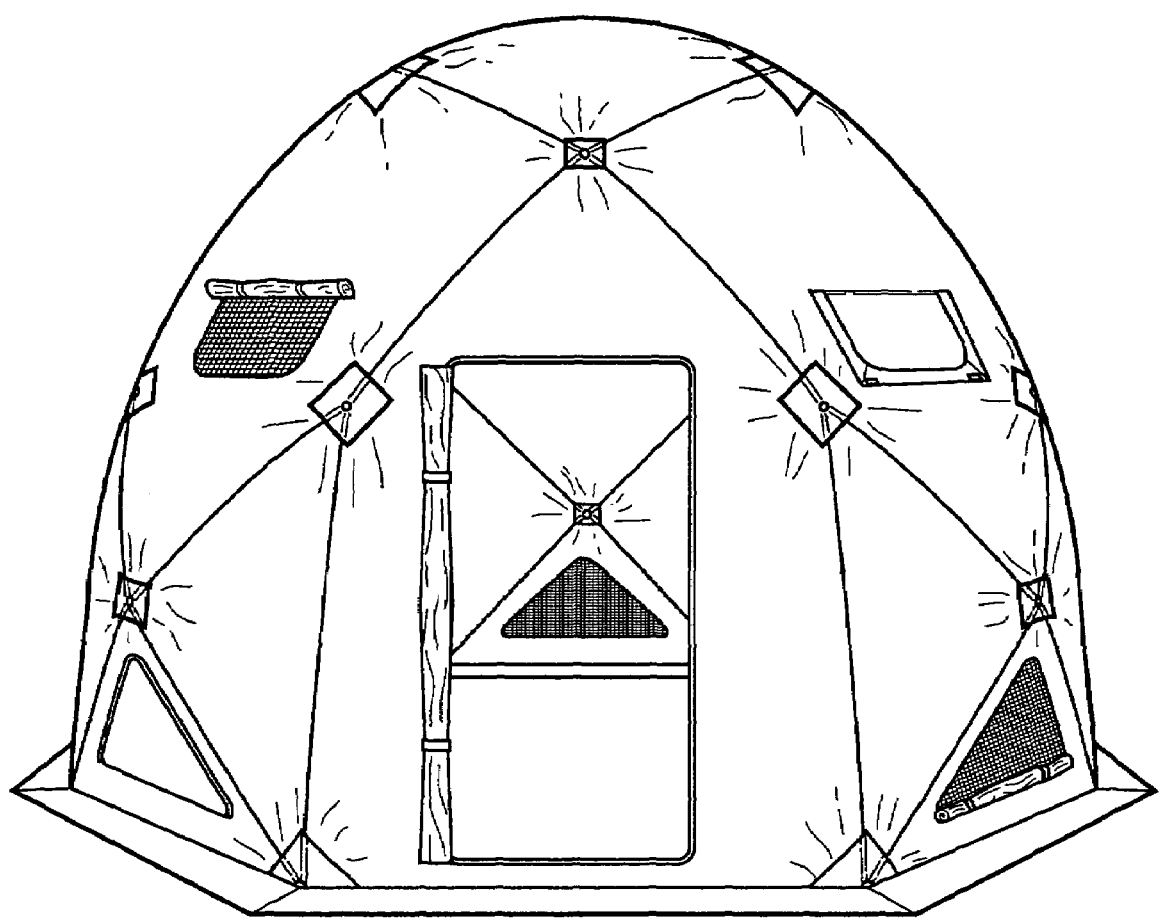
FIG. 7 is a perspective view of a seventh embodiment of the collapsible structure wherein the hub and stringer frame structure establishes a substantially dome-shaped configuration.

Variations on the greenhouse 10 disclosed in FIG. 5 include eliminating hubs 220 and support stringers 200 on one of side walls 212, as depicted in FIG. 6. In addition, a nearly infinite number of configurations may be achieved by varying the number and orientation of both hubs 220 and support stringers 200. For example, roof 230 may be constructed in a hexagonal rather than quadrilateral shape, allowing the addition of two additional wall elements 212 to create a greenhouse 10 having a hexagonal footprint and large interior volume. Alternatively, even larger configurations may be achieved by multiplying the relative geometries, as shown in one example in FIG. 7.

The greenhouse 10 as shown in FIGS. 1 through 7 may be constructed in nearly any size, from a relatively small unit designed to be used as a cloche for covering a single plant, all the way to a greenhouse large enough to accommodate people and tables or rows of plants. Certain of the various features of the greenhouse 10 in the present embodiments may be varied to accommodate the various sizes anticipated. For example, for small structures, windows 110 and their associated features may be superfluous, as might the need for support stringers 100, 102, and 104. Alternatively, larger structures might require the use of a more elaborate network of stringers 100, 102, and 104. It may be desirable as well to adjust the relative size of the door 70 with respect to the wall on which it is placed in order to allow sufficient or desirable access to the interior of the greenhouse 10.

With respect to all embodiments described above, various other modifications may be made for various applications. Specifically, each embodiment may be provided with an integral floor, and any of the above embodiments may be provided with one or more portions constructed from opaque rather than light-transmitting material to achieve particular results, botanical or otherwise. As another alternative, appropriate opaque or semi-opaque covering fabrics may be provided to cover one or more portions of any of the embodiments to offer additional versatility in providing shade or other atmospheric control within the greenhouse 10.

Once erected, each greenhouse 10 may be utilized in the same way as any conventional greenhouse, with windows providing necessary venting for temperature or humidity control. Additionally, each greenhouse 10 has appropriate ports for allowing user access and small ports for providing the introduction of water or other utilities.

While the present invention has been described in connected with what is presently considered to be the most practical embodiments, it should be understood that the invention is not limited to those embodiments. To the contrary, this patent is intended to cover various modifications and equivalent arrangements included within the spirit and scope of the appended claims, which scope is intended to be accorded the broadest interpretation so as to encompass such modifications and equivalent structures as is permitted under the law.

What is claimed is:

1. A collapsible structure comprising:
   a plurality of interconnected wall elements each having a perimeter, wherein said wall elements cooperate to define an interior space;
   each said wall element fabricated from a flexible material, wherein substantially all of said flexible material is at least translucent and allows for the transmission of at least infrared and visible wavelengths of electromagnetic radiation;
   a sleeve disposed on and completely encircling said perimeter of each of at least two wall elements of said plurality of interconnected wall elements; and
   a substantially continuous, coilable, hoop-shaped resilient frame element disposed within each said sleeve, wherein said resilient frame element is operative to tension said flexible material to maintain a respective wall element of the plurality of wall elements in a substantially planar configuration.

2. The collapsible structure stated in claim 1, further comprising:
   said material further forming a skirt.

3. The collapsible structure stated in claim 2, further comprising:
   said skirt being external to said interior space.

4. The collapsible structure stated in claim 2, further comprising:
   said skirt extending at least partially into said interior space.

5. The collapsible structure stated in claim 1, wherein each of the frame elements further comprise:
   a hub;
   at least three stringers each having a hub end and a terminal end;
   the hub ends of the at least three stringers connected to the hub; and
   the at least three stringers extending radially outward from the hub.

6. The collapsible structure stated in claim 5, further comprising:
   each stringer being pivotally connected to its respective hub.

7. The collapsible structure stated in claim 6, further comprising:
   said terminal ends of the stringers of adjacent wall elements substantially meeting at corresponding corners of adjacent wall elements.

8. The collapsible structure stated in claim 7, further comprising:
   each of the terminal ends of the stringers slidably received by a pocket provided on the material at each corner.

9. The collapsible structure stated in claim 1, further comprising:
   said material further forming a roof.

10. The collapsible structure stated in claim 1, further comprising:

said frame elements having sufficient flexibility to be coiled without breaking and sufficient resiliency to substantially return to and maintain their original shapes.

11. The collapsible structure stated in claim 10, further comprising:
said frame elements fabricated from steel.

12. A collapsible structure, comprising:
four wall elements each having a perimeter, wherein said wall elements cooperate to define an interior space;
each said wall element fabricated from a flexible material, wherein at least a portion of said flexible material is at least translucent and allows for the transmission of at least infrared and visible wavelengths of electromagnetic radiation;
a sleeve disposed on said perimeter of each said wall element; and
a substantially continuous, coilable, resilient frame element disposed within each said sleeve, wherein said resilient frame elements are operative to tension said flexible material to maintain each said wall element in a substantially planar configuration.

13. The collapsible structure stated in claim 12, further comprising:
said material having integral fibers.

14. The collapsible structure stated in claim 12, further comprising:
said material being waterproof.

15. The collapsible structure stated in claim 12, further comprising:
said material being resistant to decay from ultraviolet electromagnetic radiation.

16. The collapsible structure stated in claim 12, further comprising:
said coating provided on the material that is resistant to decay from ultraviolet electromagnetic radiation.

17. The collapsible structure stated in claim 12, further comprising:
said material being polyethylene.

18. The collapsible structure stated in claim 12, further comprising:
said material further forming a skirt.

19. The collapsible structure stated in claim 18, further comprising:
said skirt being external to said interior space.

20. The collapsible structure stated in claim 18, further comprising:
said skirt extending at least partially into said interior space.

21. The collapsible structure stated in claim 12, further comprising:
said frame elements having sufficient flexibility to be coiled without breaking and sufficient resiliency to substantially return to and maintain their original shapes.

22. The collapsible structure stated in claim 21, further comprising:
said frame elements fabricated from steel.

* * * * *